(12) United States Patent
Le-Hen

(10) Patent No.: US 9,004,124 B2
(45) Date of Patent: Apr. 14, 2015

(54) TIRE HAVING ENHANCED ROLLING PERFORMANCE

(75) Inventor: François Le-Hen, Clermont-Ferrand (FR)

(73) Assignees: Compagnie Generale des Etablissement Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 307 days.

(21) Appl. No.: 13/514,443

(22) PCT Filed: Dec. 16, 2010

(86) PCT No.: PCT/EP2010/069878
§ 371 (c)(1),
(2), (4) Date: Jul. 17, 2012

(87) PCT Pub. No.: WO2011/073312
PCT Pub. Date: Jun. 23, 2011

(65) Prior Publication Data
US 2012/0273107 A1    Nov. 1, 2012

(30) Foreign Application Priority Data
Dec. 17, 2009  (FR) ..................................... 09 59096

(51) Int. Cl.
*B60C 11/13*    (2006.01)

(52) U.S. Cl.
CPC .............. *B60C 11/13* (2013.01); *B60C 11/1307* (2013.01); *B60C 2011/1338* (2013.01)

(58) Field of Classification Search
CPC   B60C 11/13; B60C 11/1369; B60C 11/1323; B60C 11/0323; B60C 11/1307; B60C 11/1218; B60C 11/1263; B60C 11/1272
USPC .............. 152/209.18, 209.21, 209.22, DIG. 3
See application file for complete search history.

(56) References Cited

U.S. PATENT DOCUMENTS 2,322,505 A    6/1943  Bull
2,661,041 A   12/1953  Walsh
(Continued)

FOREIGN PATENT DOCUMENTS

EP    0 917 970 A2    5/1999
FR    2 152 907 A1    4/1973
(Continued)

OTHER PUBLICATIONS

International Search Report (PCT/ISA/210) issued on Feb. 2, 2011, by the European Patent Office as the International Searching Authority for International Application No. PCT/EP2010/069878.
(Continued)

*Primary Examiner* — Justin Fischer
*Assistant Examiner* — Robert Dye
(74) *Attorney, Agent, or Firm* — Dickinson Wright PLLC

(57) ABSTRACT

Tire provided with a tread surface and lateral faces intersecting at two corner edges to determine a total width of tread between the said two corner edges, provided with grooves of depth H opening onto the tread surface and delimited by faces of material which are distant by at least a width equal to 2 mm, a plurality of grooves on at least one of the opposing faces that delimit them with at least one profiled protrusion delimited by a radially external surface and by a radially internal surface, the radially external surface being closer to the tread surface than the radially internal surface, meeting at those points of the protrusion that are furthest away in the direction of the groove, each of these radially internal and external surfaces of each protrusion has, in a plane of section parallel to the faces delimiting the groove, a profile of length greater than the length of the profile of the radially internal surface.

4 Claims, 3 Drawing Sheets

(56) References Cited

U.S. PATENT DOCUMENTS

| | | | |
|---|---|---|---|
| 3,848,651 A | | 11/1974 | French |
| 5,022,448 A | * | 6/1991 | Ochiai ................ 152/209.22 |
| 5,814,169 A | * | 9/1998 | Yamaguchi et al. ..... 152/209.22 |
| 6,003,575 A | * | 12/1999 | Koyama et al. ......... 152/209.18 |

FOREIGN PATENT DOCUMENTS

| | | | |
|---|---|---|---|
| JP | EP0323165 | * | 7/1989 |
| JP | 4-345504 A | | 12/1992 |
| JP | 06-191231 | * | 7/1994 |
| JP | 2003-159910 | * | 6/2003 |
| JP | 2004-351991 | * | 12/2004 |
| JP | 2009-001145 | * | 1/2009 |
| WO | WO 99/48707 A1 | | 9/1999 |

OTHER PUBLICATIONS

Search Report issued on May 20, 2010, by the French Patent Office for Application No. 0959096.

* cited by examiner

TIRE HAVING ENHANCED ROLLING PERFORMANCE

FIELD OF INVENTION

The invention relates to motor vehicle tires and more particularly to the treads of these tires.

BACKGROUND OF INVENTION

A passenger car tire is provided with a tread radially on the outside surmounting a crown belt itself placed radially on the outside of a reinforcement. This tread provides contact between the tire as it runs and the road and needs to allow the vehicle to be steered and stopped irrespective of the driving conditions. In rainy weather, the standing water on the road surface has to be able to be removed so that the tread can effectively remain in contact with the road. If this water cannot be removed, then upwards of certain driving speeds, a mechanism whereby the tire is lifted off the road (the aquaplaning phenomenon) occurs and is detrimental to roadholding and therefore to safety. To counter that, it is known practice to provide cavities and grooves in the tread of the tire to guide the water present into these cavities and grooves and discharge the water in the grooves to the outside of the contact surface both laterally and longitudinally.

Laterally or transversely here means a direction which is parallel to the axis of rotation of the tire.

Longitudinally (or circumferentially) on the tread here means the direction perpendicular to the transverse direction and tangential to a circle centered on the axis of rotation.

A transverse groove means a groove opening at one of its ends axially towards the outside of the tire to encourage the liquid to flow laterally with respect to the path followed by a tire as it runs along a road covered with water. For preference, such a groove is oriented in a direction that makes an angle smaller than 45 degrees with the axis of rotation of the tire.

In significant depths (for example at least 2 mm) of standing water and when the vehicle speed is high, it has been found that the flow mechanism can be disturbed and lead to reduction in performance particularly in terms of safety as the onset of the aquaplaning phenomenon notably manifests itself in a loss of contact with the road surface.

Document FR2152907 discloses a tire which, in addition to the longitudinal grooves, has radial cavities in the tread, these radial cavities, which are formed on the axially external parts of the tread, being extended by a cavity formed on the inside of the tread and emerging on the external lateral faces of the tread. The tire described in that document, thanks to these radial cavities, has additional capability to remove the water on the road. However, it has been found that the tire needs to be further improved for running on a road covered with water in order to provide even better roadholding.

SUMMARY OF THE INVENTION

It is an object of the invention to provide a tread having grooves comprising at least one device that improves the roadholding of the tire provided with this tread, notably when driving on road surfaces covered with standing water.

The tire according to the invention is provided with a tread having a tread surface intended to come into contact with the road and lateral faces intersecting the tread surface at two corner edges to determine a width W of tread between the said two corner edges. This tread is provided with a plurality of grooves of depth H and delimited by faces of material which are distant by at least a width equal to 2 mm; these grooves open onto the tread surface. These grooves delimit with one another or with the lateral faces of the tread patterns that have contact faces that partially form the tread surface.

This tread comprises a plurality of transverse grooves at least one of the opposing faces of which is provided with at least a protrusion delimited by a radially external surface (extrados) and by a radially internal surface (intrados), the radially external surface being closer to the tread surface than the radially internal surface, these surfaces meeting at those points of the protrusion that are furthest away in the direction of the groove. This tread is such that each of these radially internal and external surfaces of each protrusion has, in a plane of section parallel to the faces delimiting the groove, a profile such that the length of the profile of the radially external surface is greater than the length of the profile of the radially internal surface.

The profiled protrusions formed in a groove do not provide a bilateral mechanical connection between the opposing faces that delimit the said groove but merely provide a unilateral connection, which means that they limit or even prevent only the coming-together of the opposing faces. A bilateral connection means a connection that limits and prevents both the coming-together and the separation of the opposing faces.

Furthermore, the axially innermost end (which means the end closest to the equatorial plane) of the transverse grooves provided with at least one protrusion is provided with a profiled closure device. This profiled closure device comprises a closure surface formed on at least one face delimiting the groove and at least partially closing the groove, this closure surface having, viewed in cross section in a plane of section parallel to the faces delimiting the groove, a concave curved profile to interact with the at least one protrusion formed in the groove. A concave curved profile means a surface the center of curvature of which is located axially towards the outside of the tread. Advantageously, this closure device completely or almost completely closes the groove (which means that at least 80% of the cross-sectional area of the groove is closed by the device).

The tread of the invention makes it possible, while at the same time maintaining good removal of water, to improve the pressure of the said tread on the road when driving in rainy weather thanks specifically to the circulation of water around each protrusion positioned in at least one groove. What happens is that these protrusions have an extrados and an intradros which are suited to creating an inverse-lift effect resulting in an increase in the contact pressure between the tire and the road which opposes the effect of the hydrodynamic pressure when driving through standing water that tends to lift the tread away from the road.

This closure device combined with the protrusion formed in a transverse groove increases the effect of the flow of the water and therefore the bearing effect of the tire on the ground when driving in rainy weather.

Advantageously, the protrusion extends over all or nearly all of the width of the groove in which it is made so as to enjoy all of the flow of water passing through the groove when driving in rainy weather. Here, nearly all of the width of the groove means at least 90% of the said width of the groove.

To make such a tread according to the invention easier to manufacture using molding, it is preferable to provide each face delimiting a groove with a half-protrusion, these half-protrusions facing one another in such a way as to be separated, after demolding, by only a thin slit or even a slit of no width, the said two half-protrusions being in contact with one another when the groove that contains them comes into contact with the road.

Advantageously, this thin slit comprises means for limiting or even completely blocking relative movements of one half-protrusion with respect to the other; these means may be a zigzag shape or alternatively may be reliefs formed on the opposing faces of the slit, these reliefs collaborating with one another to reduce relative movement.

In an alternative form of the tread according to the invention, the grooves provided with protrusions as described earlier are oriented transversely, which means in a direction that makes an angle smaller than 45 degrees with respect to a direction parallel to the axis of rotation of the tire.

Advantageously, the closure device is formed of two half-devices, each half-device being carried by one face delimiting the groove, these two half-devices being designed to collaborate by mutual contact as they come into contact with the road surface. For preference, the two half-devices are separated by a thin slit which may comprise means limiting the relative movements between the said half-devices when they are in contact with one another.

For ease of manufacture it is possible to produce this profiled closure device in such a way that it is formed of two half-devices, each of the said half-devices being formed on one face delimiting the groove, these half-devices being either in contact with one another or separated from one another by a thin slit (less than 1 mm wide). This thin slit may be provided with blocking means in the form of zigzags or of reliefs.

Other features and advantages of the invention will become apparent from the description given hereinafter with reference to the attached drawings which, by way of nonlimiting examples, show some embodiments of the subject matter of the invention.

DESCRIPTION OF THE PREFERRED EMBODIMENTS

Figure 1:
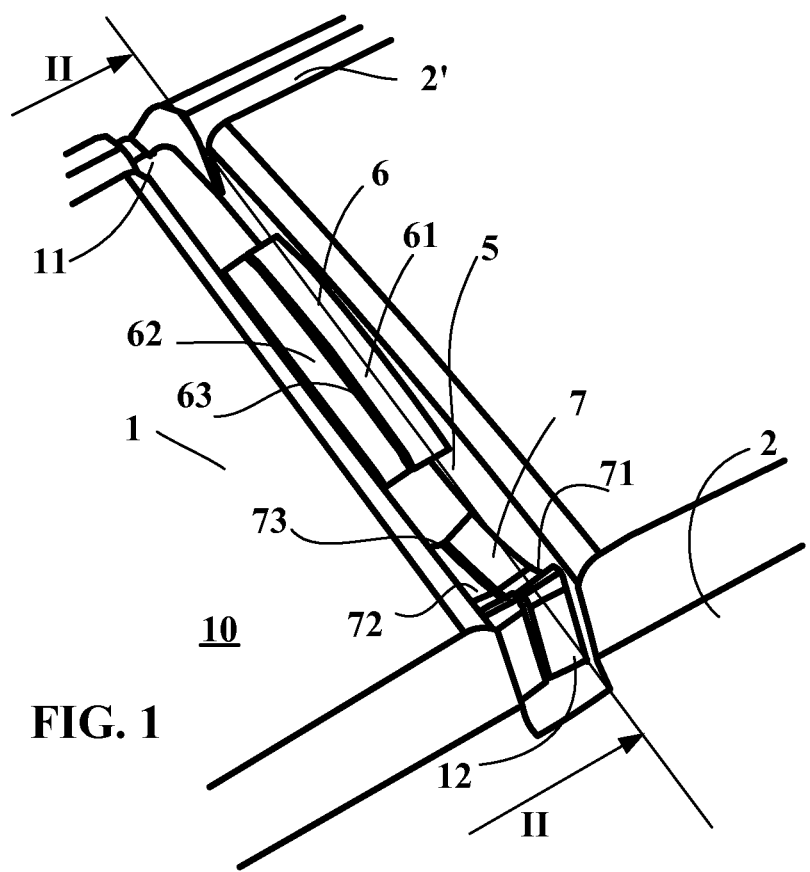
FIG. 1 shows a transverse groove of a tread according to the invention.

FIG. 1 shows one alternative form of a tread 1 according to the invention intended for a tire of size 205/55 R16. This tread comprises a plurality of transverse grooves 5 of a width equal to 3 mm and a depth equal to 7 mm, these transverse grooves opening axially onto the edges of the said tread by an end 11 that is axially on the outside. This end 11 opens into a narrow circumferential edge groove 2'. This small circumferential groove acts as an articulation region between the end of the tread and the sidewall part of the tire. The transverse groove 5 is extended as far as a second end 12 which opens into a circumferential groove 2. This groove 5 comprises a profiled protrusion 6 formed of two half-protrusions 61, 62 separated by a thin slit 63 of appropriate width that it closes when the tire comes into contact with the road surface. This profiled protrusion has a maximum length of 8 mm; it is situated approximately 1 mm beneath the tread surface 10 in the new condition (which means before the tire has run).

Furthermore, the transverse groove 5 comprises at its end 12 that opens into the circumferential groove 2 a second protrusion 7 forming a device for closing the transverse groove 5. This closure device is likewise formed of two half-protrusions 71, 72, each half-protrusion being carried by one face delimiting the transverse groove 5. These half-protrusions of the closure device are separated from one another by a thin slit 73. This thin slit 73 formed between the two half-protrusions 71, 72 of the closure device of the transverse groove 5 has an appropriate width that it allows these two half-protrusions to come into contact during running. For preference, this width is less than 1 mm, and more preferably still it is less than 0.6 mm.

This closure device 7 has a curved surface oriented in such a way as to have a center of curvature positioned axially towards the outside of the tread and thus amplify and encourage the mechanism whereby water flows around the protrusion 6 in order to generate an increase in ground contact pressure.

Figure 2:
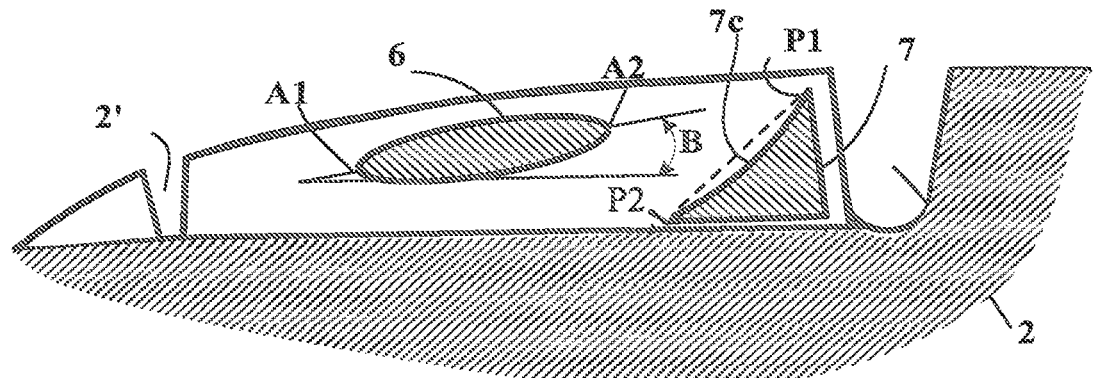
FIG. 2 is a section on the line II-II of FIG. 1.

FIG. 2 is a cross section through the groove shown in FIG. 1 on a line II-II. This cross section shows the geometry of the closure device 7 and notably the curved profile 7c of the closure surface such that its concave side faces the profiled protrusion 6. If those points on the closure device that are radially and axially furthest apart of the said device are denoted P1, P2, the curved profile 7c is such that the segment of straight line (in dotted line in the figure) joining the points P1 and P2 does not intersect the device at any other point. It may also be seen that, on either side of the axially furthest separated points A1 and A2 of the profiled protrusion 6, the said profiled protrusion comprises an external profile of a length greater than the length of the internal profile of the same protrusion. Thanks to this closure device 7, it is possible to reduce the effects of turbulence in the flow at the intersection between the circumferential groove and each transverse groove while at the same time improving the flow in the transverse grooves.

The angle B of the segment joining the points A1 and A2 here is other than zero degrees and preferably less than 20 degrees (in this particular instance this angle is 15 degrees).

Figure 3:
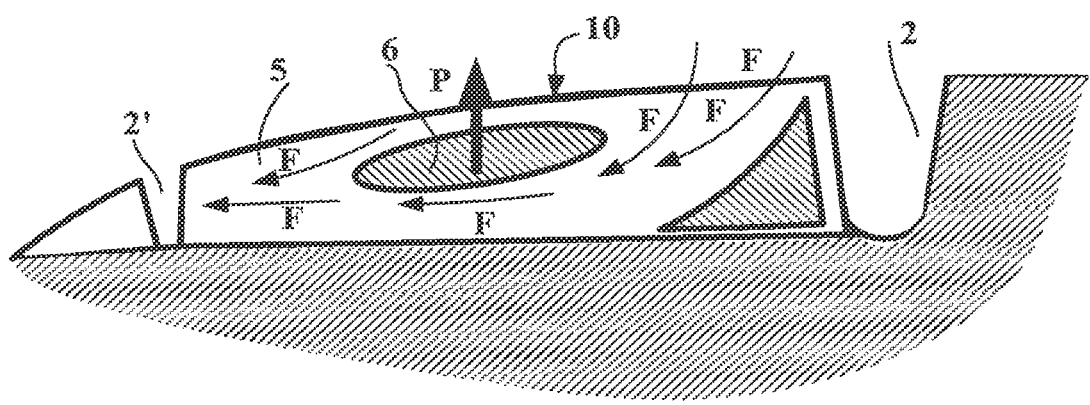
FIG. 3 is the same view as FIG. 2 with flow lines for the flow of water through the groove.

FIG. 3 is the same depiction as FIG. 2 when driving on ground covered with standing water, the ground being towards the top in the figure. This figure bears the water flow lines F starting from the ground contact surface 10 and entering the transverse groove 5 progressing axially towards the outside of the tread while flowing around the profiled protrusion 6. This forced circulation generates lift forces which lead to an increase in the ground contact pressure of the tire; these lift forces here being denoted in the form of their resultant P.

Figure 4:
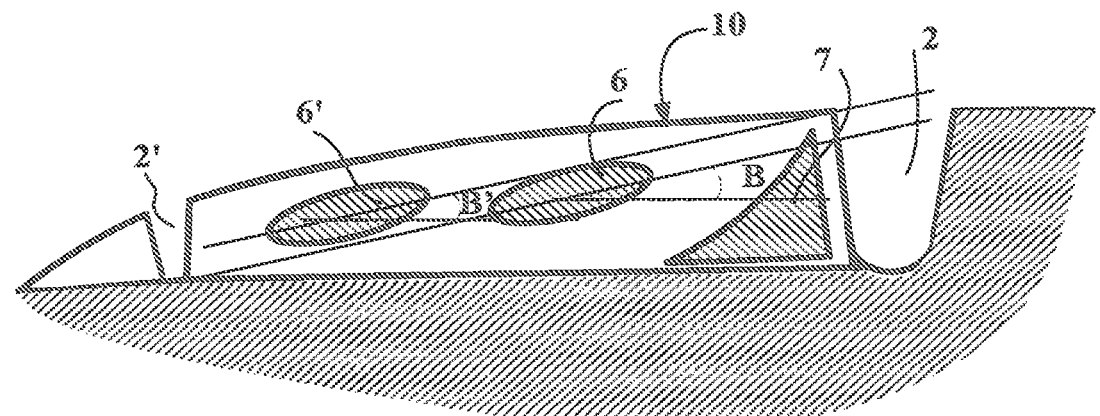
FIG. 4 is a view in cross section of an alternative form of transverse groove comprising two profiled protrusions.

FIG. 4 shows an alternative form of tire according to the invention in which a transverse groove comprises a closure device 7 at one of its ends and two profiled protrusions 6 and 6' arranged axially and radially relative to one another in such a way as not to interfere with one another in respect of the fluid flows. These protrusions are each inclined with a direction parallel to the axis of rotation at angles B, B' equal to 20 degrees. Provision could be made for these angles to be different.

Figure 5:
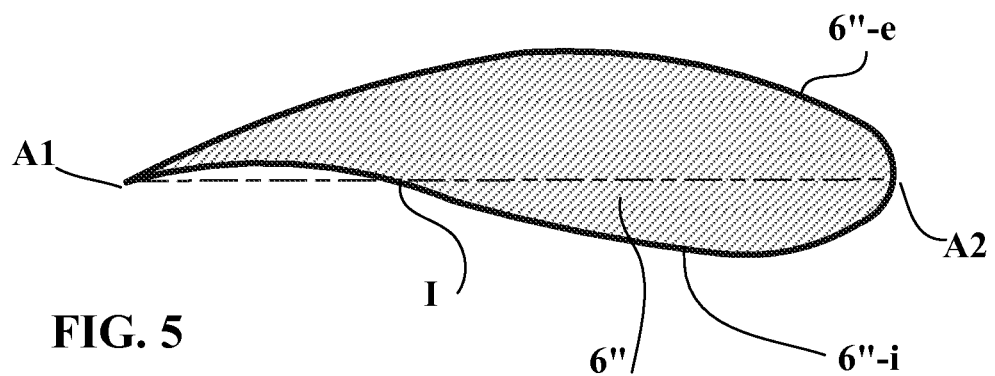
FIG. 5 is a view in cross section of an alternative form of profiled protrusion.

FIG. 5 shows an alternative form of geometry of the contour of a profiled protrusion 6" which, between the axially furthest separated points A1 and A2 of the said contour, have an external profile 6"-$e$ and an internal profile 6"-$i$, the external profile being of a length longer than the length of the internal profile.

The external profile 6"-e is defined by geometric curves having curvatures of the same sign whereas the internal profile is defined by two parts having curvatures of opposite signs. In this particular instance, the change in curvature occurs at the intersection I with the segment joining the points A1 and A2, but of course this changeover could be positioned at any other point.

Thanks to this arrangement, it is possible when driving on ground covered with standing water to create a flow of water of which the flow lines around the protrusions 6 generate hydrodynamic pressure forces that contribute to increasing the pressure of the tire on the ground. This is of particular benefit in rainy weather as it increases the contact pressures and therefore gives a greater margin before aquaplaning in particular occurs.

For practical embodiment purposes, a blade can be machined the thickness of which corresponds to the width of the groove that is to be molded, this blade having two faces which are hollowed out to form two cavities separated from one another by a fine thickness of the blade. These cavities are intended to mold a half-protrusion and the fine thickness of the blade between the two cavities molds a fine slit that separates the two half-protrusions.

Figure 6:
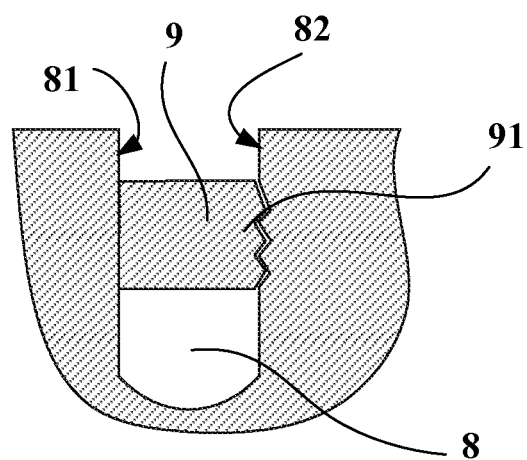
FIG. 6 is an alternative form of groove comprising a profiled protrusion, this protrusion being carried by one face of the groove and able to come into contact with the other face of the groove.

FIG. 6 shows another alternative form of a groove 8 comprising a protrusion 9, this profiled protrusion 9 being carried by one face 81 of the groove. This protrusion is separated from the other face 82 of the groove by a thin slit 91. To limit the possibilities of movement of the profiled protrusion with respect to the face 82, this slit 91 has a zigzag geometry.

The invention is not restricted to the examples described and depicted and various modifications can be made thereto without departing from its scope.

The invention claimed is:

1. A tire provided with:
   a tread having a tread surface intended to come into contact with the road, and
   lateral faces intersecting the tread surface at two corner edges to determine a total width of tread between the said two corner edges,
   wherein the tread is provided with grooves of depth H opening onto the tread surface and delimited by opposing faces of material which are distant by at least a width equal to 2 mm,
   wherein a plurality of grooves are oriented transversely, which means in a direction making an angle less than 45 degrees with respect to the axis of rotation of the tire,
   wherein the grooves are provided on at least one of the opposing faces that delimit them with at least one profiled protrusion,
   wherein the profiled protrusion is delimited by a radially external surface and by a radially internal surface, the radially external surface being closer to the tread surface than the radially internal surface, wherein these external and internal surfaces meet at those points of the protrusion that are furthest away in the direction of the groove,
   wherein each of these radially internal and external surfaces of each protrusion has, in a plane of section parallel to the opposing faces delimiting the groove, a profile such that the length of the profile of the radially external surface is greater than the length of the profile of the radially internal surface,
   wherein the transverse grooves provided with at least one profiled protrusion are further provided with a second protrusion forming a profiled closure device,
   wherein the profiled closure device is formed on at least one opposing face delimiting the groove and comprises a closure surface having, viewed in cross section in a plane of section parallel to the opposing faces delimiting the groove, a concave curved profile, which means a profile the center of curvature of which is located axially towards the outside of the tread
   wherein the at least one profiled protrusion extends over at least 90% of the width of the groove in which it is made so as to enjoy all of the flow of water passing through the groove when being run in rainy weather.

2. A tire provided with:
   a tread having a tread surface intended to come into contact with the road, and
   lateral faces intersecting the tread surface at two corner edges to determine a total width of tread between the said two corner edges,
   wherein the tread is provided with grooves of depth H opening onto the tread surface and delimited by opposing faces of material which are distant by at least a width equal to 2 mm,
   wherein a plurality of grooves are oriented transversely, which means in a direction making an angle less than 45 degrees with respect to the axis of rotation of the tire,
   wherein the grooves are provided on at least one of the opposing faces that delimit them with at least one profiled protrusion,
   wherein the profiled protrusion is delimited by a radially external surface and by a radially internal surface, the radially external surface being closer to the tread surface than the radially internal surface, wherein these external and internal surfaces meet at those points of the protrusion that are furthest away in the direction of the groove,
   wherein each of these radially internal and external surfaces of each protrusion has, in a plane of section parallel to the opposing faces delimiting the groove, a profile such that the length of the profile of the radially external surface is greater than the length of the profile of the radially internal surface,
   wherein the transverse grooves provided with at least one profiled protrusion are further provided with a second protrusion forming a profiled closure device,
   wherein the profiled closure device is formed on at least one opposing face delimiting the groove and comprises a closure surface having, viewed in cross section in a plane of section parallel to the opposing faces delimiting the groove, a concave curved profile, which means a profile the center of curvature of which is located axially towards the outside of the tread
   wherein the at least one profiled protrusion is formed of two half-protrusions, wherein each half-protrusion is formed on one of the opposing faces delimiting the groove, wherein these half-protrusions face one another in such a way as to be separated, after demolding, by only a thin slit or even a slit of no width, the two half-protrusions being in contact with one another when the groove that contains them comes into contact with the road.

3. The tire according to claim 2, wherein the thin slit comprises means for limiting or even completely blocking relative movements of one half-protrusion with respect to the other.

4. A tire provided with:
   a tread having a tread surface intended to come into contact with the road, and
   lateral faces intersecting the tread surface at two corner edges to determine a total width of tread between the said two corner edges, wherein the tread is provided with grooves of depth H opening onto the tread surface and delimited by opposing faces of material which are distant by at least a width equal to 2 mm, wherein a plurality of grooves are oriented transversely, which means in a direction making an angle less than 45 degrees with respect to the axis of rotation of the tire, wherein the grooves are provided on at least one of the opposing faces that delimit them with at least one profiled protrusion, wherein the profiled protrusion is delimited by a radially external surface and by a radially internal surface, the radially external surface being closer to the tread surface than the radially internal surface, wherein these external and internal surfaces meet at those points of the protrusion that are furthest away in the direction of the groove, wherein each of these radially internal and external surfaces of each protrusion has, in a plane of section parallel to the opposing faces delimiting the groove, a profile such that the length of the profile of the radially external surface is greater than the length of the profile of the radially internal surface, wherein the transverse grooves provided with at least one profiled protrusion are further provided with a second protrusion forming a profiled closure device, wherein the profiled closure device is formed on at least one opposing face delimiting the groove and comprises a closure surface having, viewed in cross section in a plane of section parallel to the opposing faces delimiting the groove, a concave curved profile, which means a profile the center of curvature of which is located axially towards the outside of the tread wherein the closure device is formed of two half-devices, each half-device being carried by one face delimiting the groove, wherein the two half-devices are adapted to collaborate by mutual contact as they come into contact with the road surface.

\* \* \* \* \*